United States Patent [19]

Zeuner et al.

[11] 4,126,293

[45] Nov. 21, 1978

[54] FEATHERING VALVE ASSEMBLY

[75] Inventors: Kenneth W. Zeuner, Newtown; Alonzo B. Jarman, Wrightstown, both of Pa.

[73] Assignee: Control Concepts, Inc., Newtown, Pa.

[21] Appl. No.: 705,920

[22] Filed: Jul. 16, 1976

[51] Int. Cl.$^2$ ...................... F15B 13/043; F16K 31/42

[52] U.S. Cl. ........................................ 251/30; 91/52; 137/625.64; 251/31

[58] Field of Search ........... 137/625.6, 625.61, 625.64; 91/52; 251/30, 31

[56] References Cited

U.S. PATENT DOCUMENTS

| | | | |
|---|---|---|---|
| 2,582,088 | 1/1952 | Walthers | 251/30 X |
| 2,800,143 | 7/1957 | Keller | 91/52 X |
| 2,993,477 | 7/1961 | Panissidi | 137/625.61 X |
| 3,023,781 | 3/1962 | Larsen | 91/52 X |
| 3,386,339 | 6/1968 | Selsam | 91/52 |
| 3,434,390 | 3/1969 | Weiss | 137/625.61 X |
| 3,742,980 | 7/1973 | Byers | 137/625.62 |
| 3,856,047 | 12/1974 | Takayama | 137/625.61 |
| 4,014,509 | 3/1977 | Yoshino et al. | 137/625.64 X |

FOREIGN PATENT DOCUMENTS

| | | | |
|---|---|---|---|
| 147,916 | 11/1954 | Sweden | 251/31 |

*Primary Examiner*—Gerald A. Michalsky
*Attorney, Agent, or Firm*—Frailey & Ratner

[57] ABSTRACT

A feathering valve system for modulating the fluid inflow to a selected one of first and second spool ends of a spool valve assembly. A controller is electrically coupled to first and second solenoid operated pilot valve assemblies for selectively (1) maintaining the pilot valve assemblies in a valve closed state without bleed flow through the pilot orifices or (2) supplying a predetermined value electrical signal to either, but not both, of the valve assemblies for actuating one of the assemblies to an open position related to the value of the signal. Fluid under a substantially constant pilot pressure is applied under the poppets of both valve assemblies. Fluid flow is taken from above the poppet of an actuated valve assembly to a respective spool end whereby the spool moves to a position which is a function of the actuating signal value.

9 Claims, 4 Drawing Figures

SUPPLY
PILOT DRAIN

FEATHERING VALVE ASSEMBLY

BACKGROUND OF THE INVENTION

A. Field of the Invention

This invention relates generally to the field of proportional control valves.

B. Prior Art

It has been widely known in many prior proportional control valves to use mechanical feedback. Specifically, in such valves, a torque motor has been used with a flappernozzle arrangement. However, this arrangement has left much to be desired particularly in view of the relatively high cost. In addition, such torque motors have operated on very low level forces and thus substantial amplification has been required between the low level pilot and the servo valve. Further, with low level forces, small orifices have been used which tended to easily clog and cause the valve to become inoperable. The orifices were not self cleaning because of the low level forces. A further problem has been in balancing the orifices which becomes critical because of the high amplification. A small piece of dirt lodging in one of the orifices would result in large change in the output of the servovalve.

Other known proportional control valves have left much to be desired in simplicity of operation, reliability and cost. For example, see the following patents U.S. Pat. Nos. 2,993,477; 3,434,390; 3,742,980; 3,749,128; 3,757,822; 3,799,202.

Accordingly, an object of the present invention is a feathering valve assembly which exhibits important characteristics of a proportional control valve but at substantially lower cost with high reliability and simplicity of operation.

SUMMARY OF THE INVENTION

A feathering valve system for modulating the fluid inflow to the spool ends of a spool valve assembly. First and second electrohydraulically operated normally closed pilot valve assemblies respectively have first and second plug means which are movable between (1) valve closed states seating in and closing respective pilot orifices for preventing any substantial flow of fluid through the respective pilot orifices and (2) valve open states. The first and second plug means are individually operated and are not mechanically connected to each other. A controller is electrically coupled to the pilot valve assemblies for selectively applying a predetermined value electrical signal to either, but not both of the pilot valve assemblies for actuating one of the assemblies to an open position where that position is related to the value of the signal. A pilot source supplies fluid under a substantially constant pilot pressure under the first and second plug means through the pilot orifices. Fluid flow is taken from above the plug means of an actuated valve assembly to a respective spool end tending to close the respective plug means thereby producing negative feedback, whereby the spool moves to a position which is a function of the actuating signal value.

DETAILED DESCRIPTION

Figures 1, 2, 4:
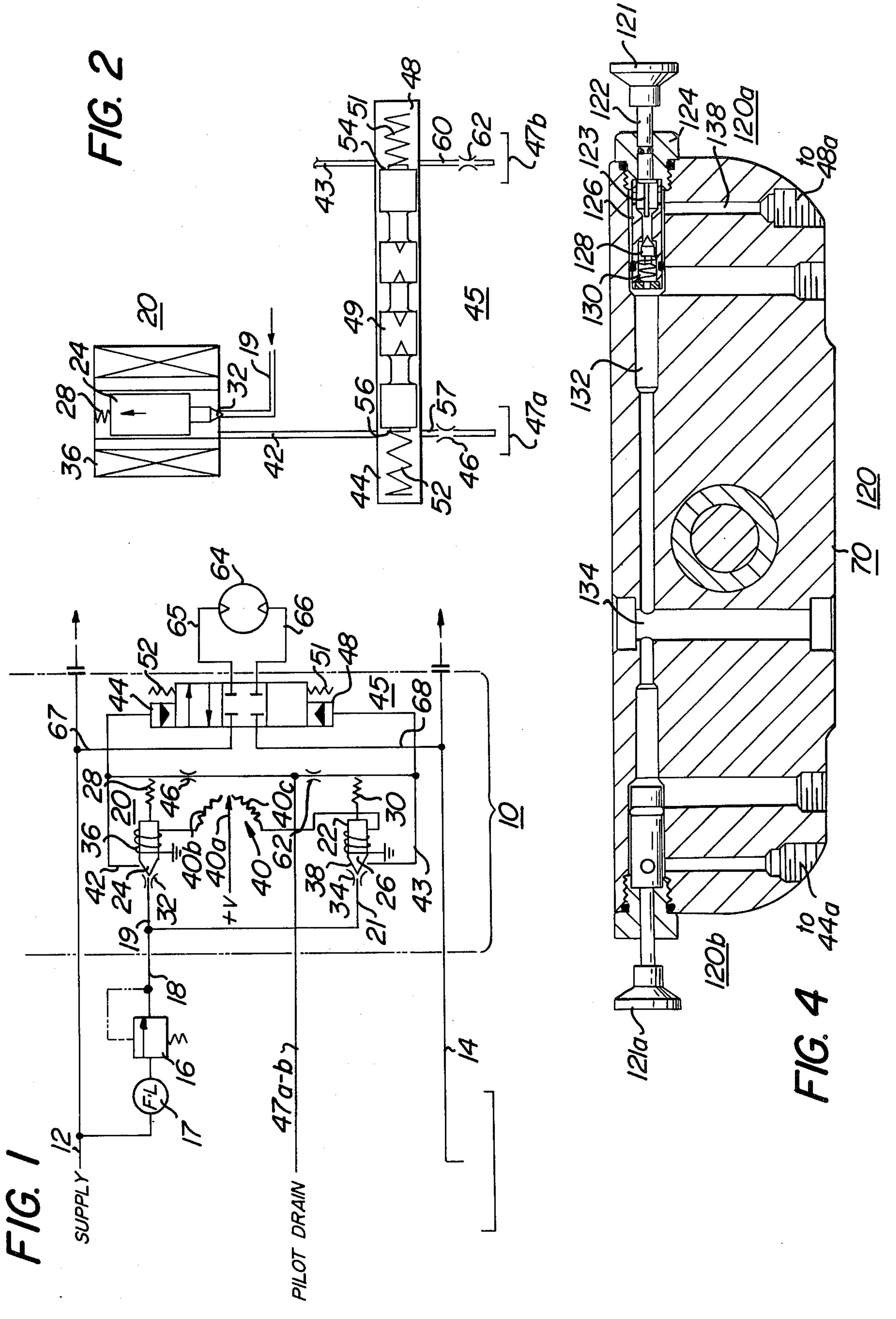
FIG. 1 is a schematic block diagram of a feathering valve assembly of the present invention.
FIG. 2 is a fragmentary drawing showing portions of the elements of FIG. 1.
FIG. 4 is an elevational sectional view of a manual over-ride assembly used with the feathering valve assembly of FIG. 3.

Referring now to FIG. 1, there is shown a block diagram of a hydraulic system including a single remote feathering valve assembly 10 coupled to a supply line 12 and a drain line 14. For reasons later to be described, in order to reduce the pressure of the supply line to a desired pilot pressure there is provided a conventional pressure reducing pressure control valve 16 having a filter 17 coupled to line 12. For valve assembly 10, the output of valve 16 is applied by way of (1) line 18 and line 19 to pilot valve 20 and (2) line 18 and line 21 to pilot valve 22. It will be understood that there may be additional valve assemblies 10 forming a stack of similar feathering valve assemblies each one connected between lines 12 and 14 and each one receiving reduced pilot pressure by way of line 18. Each of such additional feathering valve assemblies operate in similar manner and in a typical example from 1 to 10 feathering valve assemblies may be included in one stack.

Pilot valves 20, 22 are normally closed solenoid operated valves having respective plugs or poppets 24, 26 which are maintained normally closed against orifices 32, 34 by respective springs 28, 30. For example, orifices 32, 34 may be 0.104 inch diameter with the respective spring exerting a force of approximately 2.5 lbs. The pilot pressure on lines 19, 21 is respectively applied through orifices 32, 34 under poppets or plugs 24, 26 with springs 28, 30 providing sufficient preload to balance out the pilot pressure. Accordingly, there is substantially no leakage coming through each of valves 20, 22 with pilot pressure applied under the poppet and no potential applied to respective electromagnetic coil 36, 38.

Thus, under normal or quiescent condition (with contact **40*a* in its illustrated central position) the pilot pressure from line 18 is divided under poppets or plugs 24 and 26 and with these poppets being spring closed, there is no flow through orifices 32, 34. In order to energize either of coils 36, 38 and thus to modulate the inflow to assembly 45, there is provided a controller 40 comprising a rheostat with a sliding contact 40*a*, a lower resistive element 40*c* coupled to coil 38 and an upper resistive element 40*b* coupled to coil 36. With contact 40*a* coupled to +V and elements 40*a*, *b* centrally separated, only one of coils 36, 38 may be energized at any one time. If slider 40*a* is moved upwardly to contact element 40*b*, poppet 24 is attracted to its pole piece with the movement away from orifice 32 being in proportion to the current supplied to coil 36. Accordingly, pilot flow then may be traced through orifice 32 below poppet 24 and then above poppet 24, line 42, and thence to the first spool end chamber 44 of spool valve assembly 45 shown in more detail in FIG. 2. In chamber 44, a linear spring 52 is coupled to the first or left end 56 of spool 49. In a second chamber 48, a linear spring 51 is coupled to the second or right end 54 of spool 49. Both springs 51, 52** have high spring forces.

As contact **40*a* is moved upwardly and the current to coil 36 is increased, the electromagnetic force increases proportionately thereby compressing substantially very stiff spring 28 and allowing pilot flow through orifice 32** and into spool end 44. The motion of armature 24 against spring 28 is of relatively small stroke as for example 0.005 inch total travel for full opening of poppet 24.

Spool end chamber 44 has a bleed line 57 having a fixed bleed orifice 46 which connects chamber 44 to a pilot drain 47*a*. Variable orifice 32 and fixed orifice 46 act as a pressure divider. Accordingly, as poppet 24 moves away from orifice 32 increasing the orifice opening in proportion to current, the pressure in chamber 44 increases and that increasing pressure is translated to spool motion by compression of spring 51. It will be understood that the relation between variation in current and spool motion is approximately linear as a result of an effective pressure feedback which may be understood as follows.

It will first be assumed that contact 40*a* is moved upwardly to a new location on resistance element 40*b* thereby increasing current through coil 36. Accordingly, poppet 24 moves away from orifice 32 to a new first position as a result of the increased current. With poppet 24 at the first position, there is an increased flow through orifice 32 under poppet 24 and then over poppet 24 and into chamber 44 which effectively compresses the oil within that chamber. In this manner, there is a pressure increase in chamber 44 which causes an increase in outflow on line 57. That increased pressure in chamber 44 is also applied back over poppet 24 which is effective in a direction to tend to close that poppet. Thus, poppet 24 moves toward orifice 32 until a steady state position is reached where the flow in is equal to the flow out. Poppet 24 remains in such a steady state position for the new location of slider contact 40*a*.

By means of the foregoing "unbalanced" design with the flow to spool valve assembly 45 being modulated, there is effectively achieved a pressure feedback or closed fluid loop effect. This operation tends to linearize the relationship between the current produced by rheostat 40 and the fluid pressure in end cap 44. The pressure in end cap 44 is proportional to the position of the spool 49 since the spool is moving to the right (FIG. 2) against a substantially linear spring 51.

An advantage of the foregoing pressure feedback is that it provides a substantially higher response time. When poppet 24 moves to a new first position, a larger orifice opening is produced as compared with the final steady state position. As a result of this initial larger orifice opening, there is increased flow and thus steady state is reached more quickly.

In order for the foregoing effective pressure feedback to operate, it will be understood that the pilot pressure at line 19 under poppet 24 (and at line 21 under poppet 26) is required to be maintained substantially constant. Pressure control valve 16 is effective to maintain this pressure at a value which is lower than the known perturbation of supply 12 which, for example, may vary within a band or range of 500 to 3000 psi. Accordingly, valve 16 is selected to provide the substantially constant pilot pressure which is below the lowest value of that range, as for example, 350 psi.

As previously described only one of the solenoid valves 20, 22 may operate at any one time to modulate the inflow to assembly 45. Accordingly, with valve 20 actuated when slider 40*a* is moved, valve 22 is maintained closed and the oil in end cap 48 acts as a damper and may be pushed out of line 60 into drain 47*b*. With slider 40*a* in its illustrated center position, valve assembly 10 is in its quiescent or normal state. Accordingly, both poppets 24, 26 are closed and no bleeding occurs which would be wasteful of energy. Specifically, in the quiescent state, poppets 24, 26 close orifices 32, 34 and there is no flow of oil into end caps 44, 48. In this manner, the spool 49 is maintained in its centered quiescent position without the requirement of an undesirable continuous flow of bleed oil.

Spool 49 moving to the right as shown in FIG. 2 corresponds with the spool moving downwardly as shown in FIG. 1 thereby to provide motor 64 with fluid flow between lines 12, 14 in the manner indicated. It will be understood that solenoid valve 22 operates in a corresponding manner to that described in detail with respect to solenoid valve 20. In FIG. 2, line 43 is coupled to chamber 48 which has a bleed line 60 with a fixed bleed orifice 62 leading to a pilot drain 47*b*. If slider 40*a* is moved downwardly to contact element 40*c*, poppet or plug 26 is attracted to its pole piece with the movement away from orifice 34 being in proportion to the current supplied to coil 38. Accordingly, pilot flow may then be traced through orifice 34 from below poppet 26 and then above poppet 26 through line 43 and thence to chamber 48 for modulating the inflow to assembly 45. Variable orifice 34 and fixed orifice 62 act as a pressure divider.

In the previously described manner, contact 40*a* may be assumed to move downwardly to a new location on element 40*c*, thereby increasing current through coil 38. Accordingly, poppet 26 moves away from orifice 34 to a new first position as a result of that increased current. There is a resultant increase in flow through orifice 34 under and then over poppet 24 into chamber 48 thereby increasing the pressure in that chamber. That increased pressure is applied back over poppet 26 to tend to close that poppet and thus the poppet moves towards orifice 34 until a steady state position is reached. In this manner, spool 49 moves to the left (FIG. 2) against a substantially linear spring 52. As a result, there is a substantial linearization between the applied current and the position of spool 49. With spool 49 moving to the left as shown in FIG. 2 which corresponds to the spool moving downwardly as shown in FIG. 1, motor 64 is supplied with fluid flow in the manner indicated.

Figure 3:
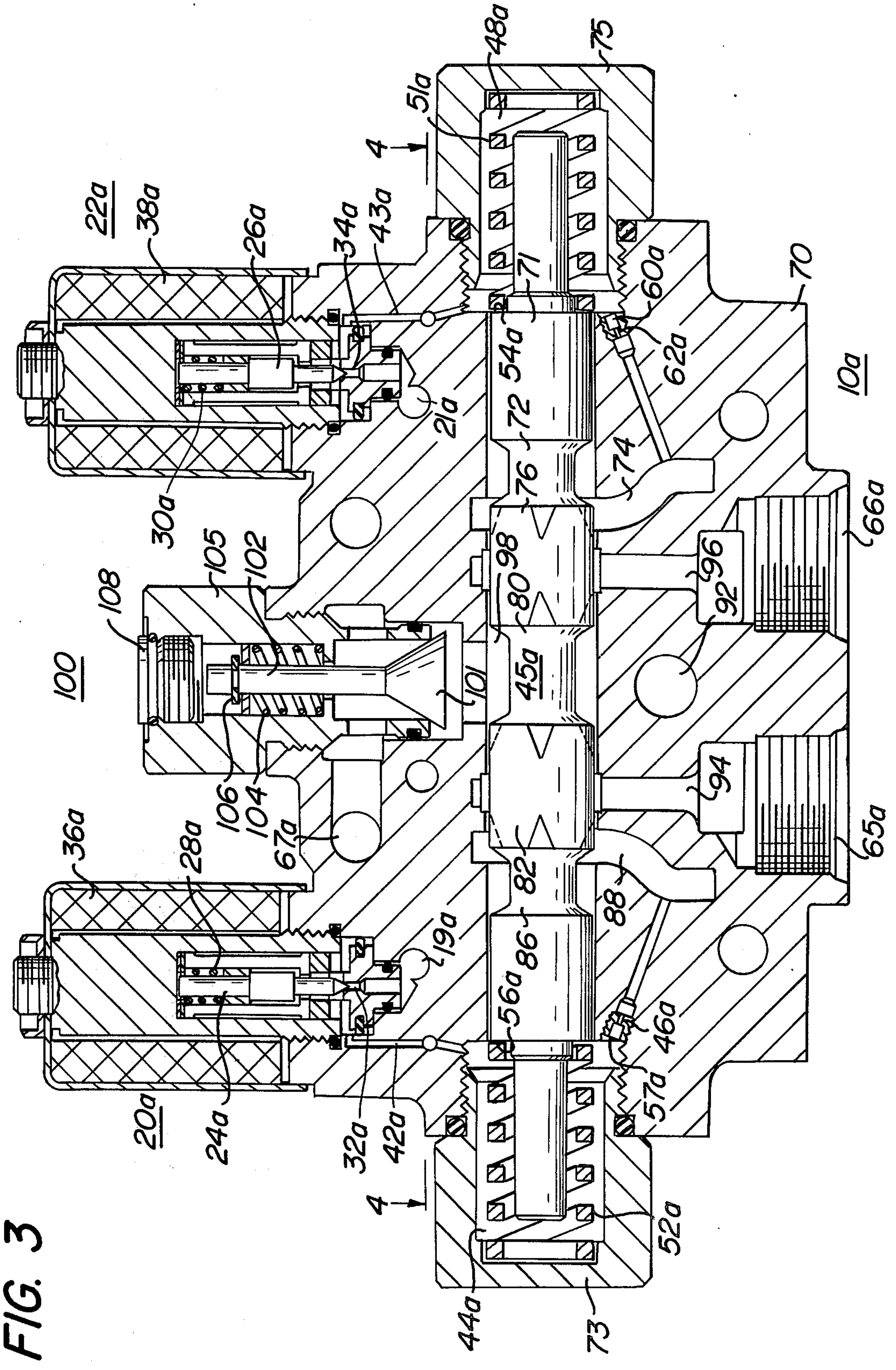
FIG. 3 is a detailed elevational sectional view of a feathering valve system shown in block diagram form in FIG. 1.

FIG. 3 shows in more detail a remote feathering valve 10*a* comprising solenoid valves 20*a*, 22*a* and spool valve assembly 45*a*. In FIG. 3 components similar to components of FIGS. 1 and 2 have been identified with the same reference character plus a subscript. Supply line 67*a* leads through a check valve poppet 101 of a check valve assembly 100 into port 98 which is the supply connection for the spool valve assembly. Output port 94 flows into line 65*a* and port 96 flows into line 66. Fluid from output ports 74 and 88 flow by way of line 92 through line 68 (FIG. 1) to tank line 14.

Pilot line 19*a* is coupled through orifice 32*a* under poppet 24*a*. Line 42*a* from assembly 20*a* is over the poppet and is coupled directly to chamber 44*a* which is formed by an end cap 73 threadedly received in body 70. The fluid from chamber 44*a* is coupled through line 57*a* having a restriction 46*a* to output port 88 which is common to tank. Similarly, pilot line 21*a* is coupled through orifice 34*a* and under poppet 26*a* and thence through line 43*a* to chamber 48*a*. Chamber 48*a* is formed by end cap 75. The output of the chamber 48*a* is taken through line 60*a* having a restriction 62*a* to output port 74 and then to tank.

As previously described, when coil 36a of assembly 20a is energized, the inflow to spool valve assembly 45a is modulated and spool 71 moves to the right and thus flow may be traced from port 94 to tank line 88. In addition, fluid flows from supply line 67a through assembly 100 and through port 98 across to port 96. On the other hand, with assembly 22a actuated, spool 71 moves to the left and supply line 67a is coupled through port 98 to port 94 while port 96 is coupled to tank line 74.

Check valve assembly 100 is used to prevent reverse flow and permit flow only in one direction from line 67a to port 98. Accordingly, assembly 100 includes a poppet 101 which fits within a seat and is held against the seat by spring 104. A plug in body 105 is threadedly engaged within the upper side of body 70 and a plug 108 allows for assembly of the check valve.

The spring rate of springs 51a and 52a are selected so that upon full pilot pressure applied to the respective chamber is sufficient to push the spool 71 all the way over until a stop is reached. For example, springs 51a, 52a may each have a spring rate of 460 pounds per inch. Spool 71 may have an outer diameter of 0.875 inch.

Feathering valve 10a may be converted for marine safe use by applying a substantially lower current to coils 36a, 38a and providing a substantially larger orifice diameter for orifices 32a, 34a. For example, the current for each of coils 36a, 38a may be approximately 0.1 amp for maximum stroke in conventional operation while in marine operation the applied current to each of these coils may be 60 ma. In such marine operation, orifices 32a, 34a may have an inner diameter of 0.048 inch, for example.

Solenoid valve assemblies 20a, 22a may each substantially comprise the normally closed valve assembly shown in U.S. Pat. No. 3,737,141 where springs 28a, 30a, each have, for example, a spring rate of 266 pounds per inch.

Referring now to FIG. 4, there is shown a manual override assembly provided on body 70. Assembly 120 comprises a right assembly 120a which is associated with valve assembly 22a and a left assembly 120b which is associated with valve assembly 20a. Each of assemblies 120a, 120b is effective to manually operate its associated valve assembly.

For example, in order to manually operate valve assembly 22a, it is only necessary to manually push in plunger 121. Similarly, in order to manually operate valve 20a it is only necessary to push in plunger 121a. Since assemblies 120a, 120b are identical, only one of them need be described in detail.

Pilot pressure is applied by way of line 18 to line 134 which is coupled by way of conduit 132 to spring actuated poppet 128. Poppet 128 is maintained normally closed by spring 130. By pushing plunger 121, rod portion 123 engages and opens poppet 128. Accordingly, fluid flows from line 134, through line 132, around the poppet and then into line 138 which is coupled to chamber 48a. In this manner, there is provided manual operation of spool valve assembly 45a.

What is claimed is:

1. A feathering valve system for modulating the fluid inflow to a selected one of first and second spool ends of a spool valve assembly having a movable spool comprising:

first and second electrohydraulically operated normally closed pilot valve assemblies respectively having first and second plug means movable between (1) valve normally closed states seating in and closing respective first and second pilot orifices for preventing any substantial flow of fluid through respective first and second pilot orifices and (2) valve open states, said first and second plug means being individually operated and not mechanically connected to each other, controller means electrically coupled to said pilot valve assemblies for selectively applying a predetermined value electrical signal for actuating one of said assemblies to an open position related to the value of said signal;

pilot source means for applying fluid under a substantially constant pilot pressure under said first and second plug means through said pilot orifices, and first and second conduit means for providing modulating fluid flow from above the first or second plug means of an actuated valve assembly to a respective spool end tending to close the respective plug means thereby producing negative feedback, whereby said spool moves to a position which is a function of the actuating signal value.

2. The feathering valve system of claim 1 in which each of said plug means has a taper with the larger cross section of the taper being remote from a respective pilot orifice, there is provided for said first and second spool ends first and second spool end chambers having first and second bleed lines each having a fixed restricted orifice whereby said first pilot orifice and said first bleed line act as a pressure divider and said second pilot orifice and said second bleed line act as a pressure divider whereby an increased pressure in an end chamber associated with an actuated valve assembly is applied back as pressure feedback above an associated plug means until a steady state position is reached where above a respective plug means relates to the area adjacent the larger plug means cross section.

3. The feathering valve system of claim 2 in which there is provided first and second substantially linear springs coupled to said first and second spool ends respectively whereby the pressure in an end chamber associated with an actuated valve assembly is proportional to the position of the spool.

4. The feathering valve system of claim 3 in which said first and second pilot valve assemblies are normally closed solenoid operated valve assemblies.

5. The feathering valve system of claim 4 in which there is provided fluid supply means for supply of fluid over a range of pressure to said spool valve assembly, said pilot source means including means for reducing said supply pressure to provide said substantially constant pilot pressure below the lowest value of the range of supply pressure.

6. The feathering valve system of claim 5 in which said first and second solenoid operated pilot valve assemblies respectively have first and second coil means each for selectively producing an electromagnetic flux line flow upon energization by said controller means.

7. A feathering valve system for modulating the fluid inflow to first and second spool end chambers of a spool valve assembly having a movable spool comprising:

first and second solenoid operated normally closed pilot valve assemblies respectively having first and second plug means movable between (1) valve normally closed states seating in and closing first and second pilot orifices for preventing any substantial flow of fluid through respective first and second pilot orifices and (2) valve open states, said first and second plug means being individually operated and not mechanically connected to each other, controller means electrically coupled to said pilot valve assemblies for selectively (1) maintaining said pilot valve assemblies in said valve closed state without bleed flow through said pilot orifices to said spool valve assembly or (2) applying a predetermined value electrical signal to either but not both of said first and second pilot valve assemblies thereby to actuate one of said assemblies to an open position related to the value of said signal, pilot source means for applying a substantially constant pilot pressure to said pilot orifices and under said first and second plug means, and first and second conduit means for respectively conducting modulating fluid from above said first and second plug means to said first and second spool end chambers tending to close the respective plug means and means for bleeding fluid from said spool end chambers whereby there is achieved a pressure feedback from an end chamber associated with an actuated pilot valve assembly to that assembly thereby to linearize the relationship between the fluid pressure in that end chamber and the actuating signal value.

8. The feathering valve system of claim 7 in which there is provided fluid supply means for supply of fluid over a range of pressure to said spool valve assembly, said pilot source means including means for reducing said supply pressure to provide said substantially constant pilot pressure below the lowest value of the range of supply pressure.

9. The feathering valve system of claim 7 in which said first and second solenoid operated pilot valve assemblies respectively have first and second coil means each for selectively producing an electromagnetic flux line flow upon energization by said controller means.

* * * * *